Feb. 11, 1969  R. J. FAY  3,427,649
METHOD AND APPARATUS FOR PRODUCING SHAPED ARTICLES
Filed Sept. 12, 1966  Sheet 1 of 2
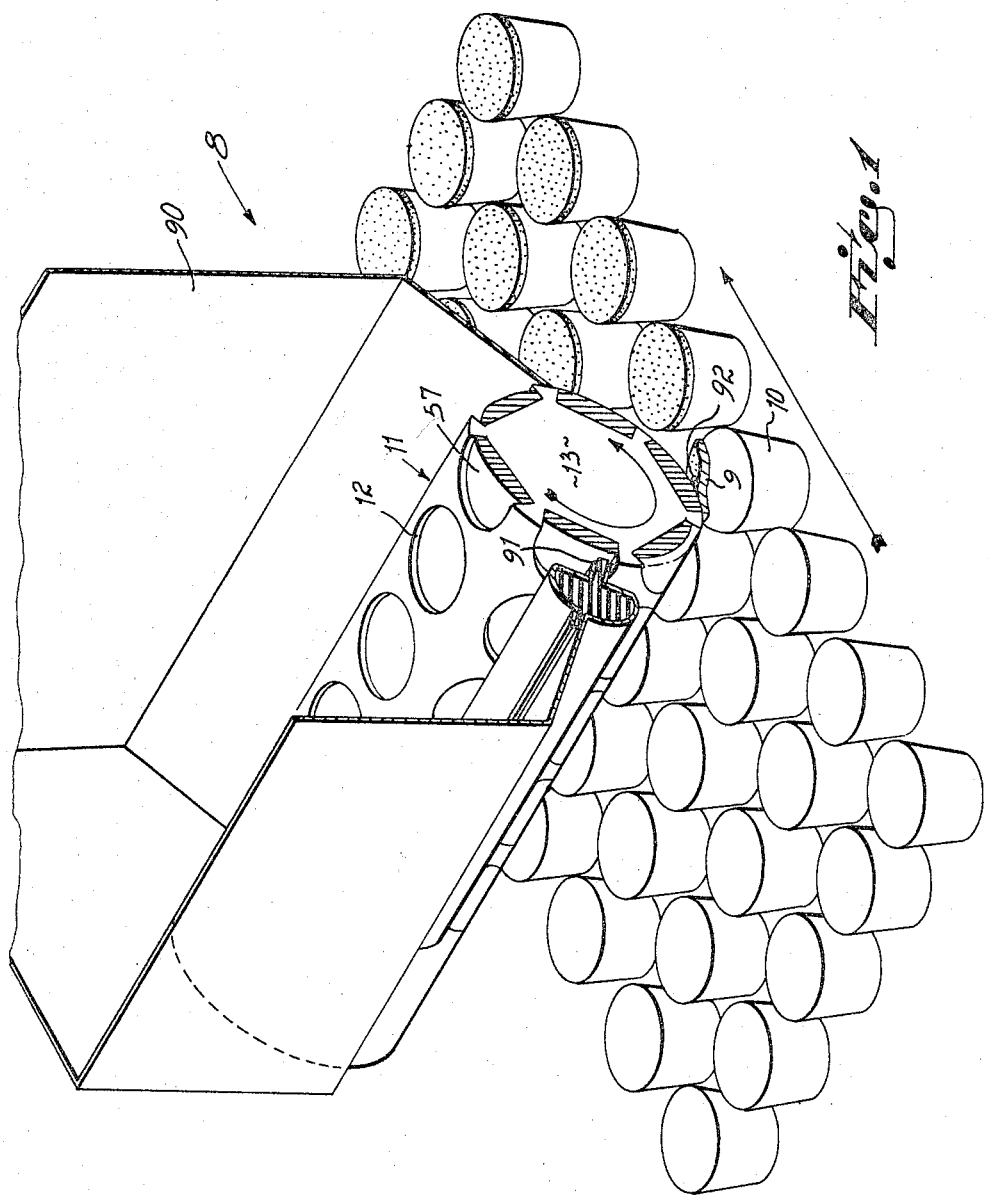
INVENTOR
Rudolph J. Fay
BY
Wood, Herron & Evans
ATTORNEYS

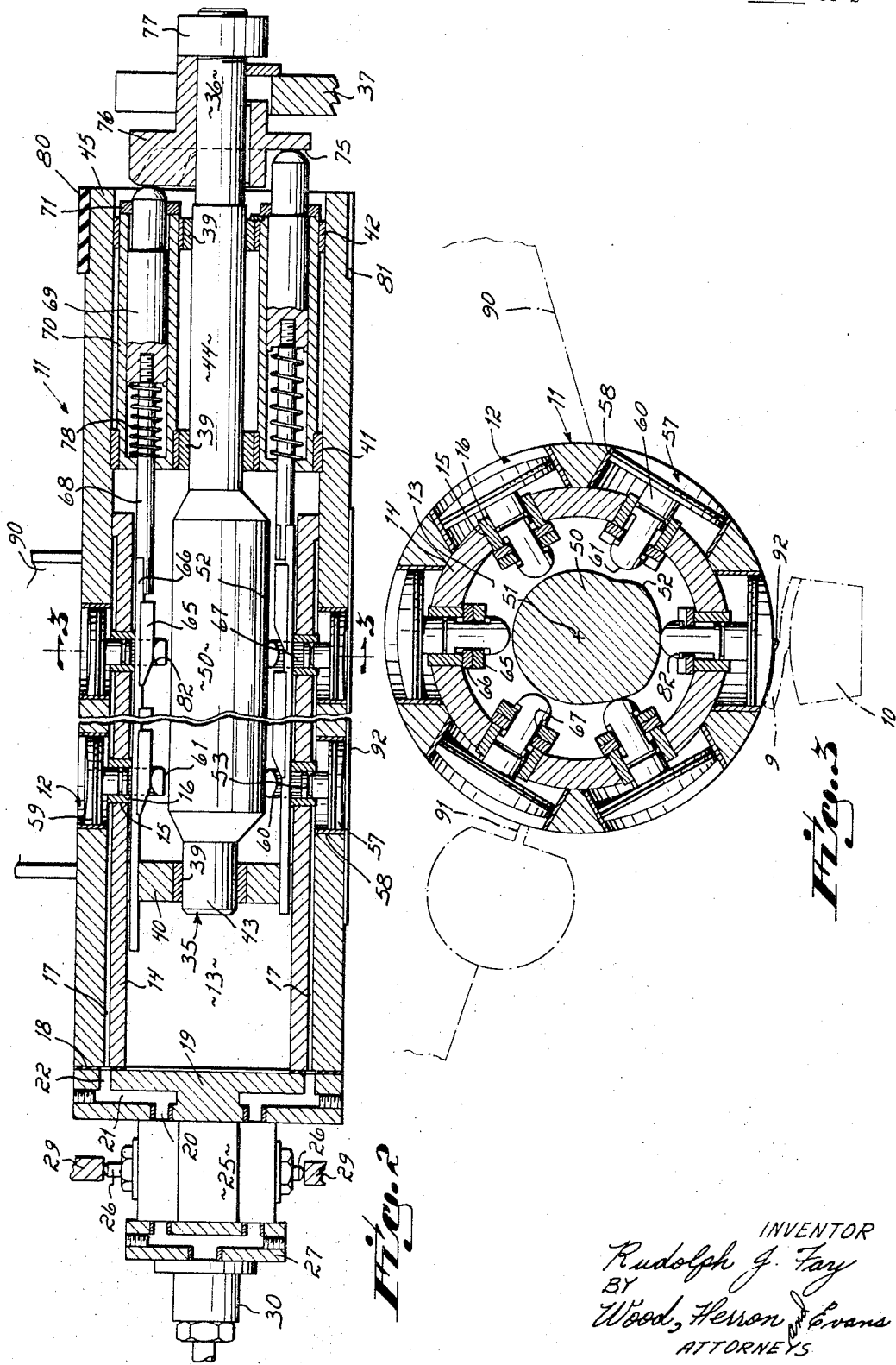

United States Patent Office 3,427,649
Patented Feb. 11, 1969

3,427,649
METHOD AND APPARATUS FOR PRODUCING SHAPED ARTICLES
Rudolph J. Fay, 6911 Wildflower Trail, Cincinnati, Ohio 45230
Filed Sept. 12, 1966, Ser. No. 578,668
U.S. Cl. 107—8                 8 Claims
Int. Cl. A21d 8/00; A21c 11/00; B29c 7/00

ABSTRACT OF THE DISCLOSURE

A method and machine for producing a configurated food product in die cavities of a rotary die roll, each of the die cavities being defined by a configurated side wall and a porous bottom wall. During each revolution of the roll, a batch of the product is forced into each cavity as the cavities pass beneath a hopper. Upon continued rotation of the roll, the bottom walls of the cavities are moved outwardly so as to force the configurated products from the die cavities. Air at a pressure above that of the atmosphere is directed through the porous bottom walls while the extended walls move past a wiper wire. The wire enters between the extended walls of the cavity and the configurated products so as to force the products off of the wall. To prevent the products from crawling over the wire and reengaging the bottom walls, air continues to be forced through the porous bottom walls until after the walls have passed the wiper element.

---

This invention relates to a method and apparatus for producing shaped articles and, more particularly, to apparatus for shaping food products within configurated die cavities.

In the course of high volume production, it is often desirable to automatically shape a substance which is very sticky and therefore difficult to handle. Shaping is often done in die cavities. However, in the case of a sticky substance, die cavity forming is often impractical because of the difficulty of rapidly and positively extracting the configurated product.

It has been, therefore, a primary objective of this invention to provide an improved method and apparatus for automatically shaping soft, tacky or sticky substances in die cavities and for extracting these configurated products from the dies. Examples of substances which are difficult to handle because of their sticky character but which can be automatically shaped according to the invention of this application are cake icing, peanut butter, raw dough, marshmallow, jellies and jams.

This invention is predicated upon the concept of utilizing air pressure introduced through a porous member in the bottom of a die cavity to break the surface adhesion between the die and the formed substance, in combination with a postive ejection mechanism for positively forcing the substance from the die cavity. Additionally, this invention incorporates a fixed wiper element operable to wipe the substance from the extended bottom surface of the die cavity so as to insure positive ejection. The wiper forces the substance to drop off of the bottom surface of the die cavity even though a few tenacles of substance may remain attached to the cavity. Some substances such as cake icing, have a tendency to pass over the wiping element and to re-adhere to the bottom surface of the die. Maintenance of the air pressure even after the substance should have dropped free from the die cavity prevents this type of re-adhesion.

The practice of using air pressure to eject products from die cavities and to avoid adhesion of the product to the die cavity is old as evidenced by my U.S. Patent No. 3,205,837. Additionally, it is known to use ejection plungers to eject formed substances from die cavities. However, to my knowledge no one has ever used a porous bottom die cavity member through which air is passing to positively eject sticky formed substance from a die cavity. It is this combination, particularly when used in combination with a wiper element, which has made it feasible to form very sticky substances in die cavities.

The primary advantage of this invention is that it enables many substances to be automatically formed in die cavities which heretofore have required other special handling techniques.

These and other objects and advantanges of this invention will be more readily apparent from the following description of the drawings in which:

FIGURE 1 is a perspective cross-sectional view of a cake icing machine embodying the invention of this application, FIGURE 2 is a cross-sectional view taken through the rotary die roll of the machine of FIGURE 1, FIGURE 3 is an enlarged cross-sectional view taken along line 3—3 of FIGURE 2.

Referring to FIGURE 1, a preferred embodiment of the invention of this application is illustrated as applied to a cake icing machine 8 for placing configurated layers of frosting or icing 9 on the tops of rows of cakes 10 as the cakes pass on a conveyor beneath a rotary die roll 11.

A plurality of radial cavities or openings 12 extend into a hollow interior 13 of the die roll 11. The cavities 12 are arranged about the roll 11 in a series of circumferential rows with the cavities of each row being longitudinally aligned with cavities of other circumferential rows so as to form columns of cavities longitudinally of the roll 11.

Referring now to FIGURES 2 and 3, it will be seen that a die plunger mounting sleeve 14 is secured within the interior 13 of the die roll 11. This sleeve 14 has a plurality of radial apertures 15 coxially aligned with the die cavities 12 of the die roll, each aperture being fitted with a bushing 16. Six longitudinal grooves 17, aligned with the axes of the holes 15, are milled from the surface of the sleeve 14. These grooves cooperate with the interior surface of the die roll to define channels for the passage of air from a port plate 19 to the die cavities 12.

The port plate 19 is rigidly mounted upon the end 18 of the die roll and has six spaced holes 20 drilled in the end face thereof. Each hole 20 is connected to one of the six channels 17 by a radial hole 21 and a longitudinal hole 22 of the port plate 19.

Six conventional two way valves 25 are fixedly attached to the end face of the port plate 19. Each valve includes a plunger 26 operable to control the flow of air from a distribution plate 27 to the port plate 19, and subsequently to the die cavities 12 of the rotary die roll 11. Because the distribution plate 27, valves 25, port plate 19, and die roll 11 are all fixedly joined together, they rotate in unison relative to a fixed cam 29 which controls actuation of the plungers 26 and thus the flow of air through the valves 25. Air is supplied to the distribution plate 27 through a conventional rotary air coupling 30.

The die roll 11 is mounted for rotation about a stationary cam shaft 35, one end 36 of which is fixedly mounted within a stationary frame plate 37 of the cake icing machine 8. Three longitudinally spaced bearing plates 40, 41, and 42 support the die roll 11 upon the stationary cam shaft 35. One bearing plate 40 is mounted upon one end section 43 of the cam shaft 35; the second bearing plate 42 is mounted upon an intermediate section 44 of the cam shaft adjacent the end 45 of the die roll 11; and the third bearing plate 41 is also mounted upon the intermediate section 44 of the shaft 35 between the bearing plates 40, 42. The bearing plate 40 is rigidly secured within the interior of the support sleeve 14 while the bearings 41, 42 are both rigidly secured within the interior of the die roll 11. To minimize friction between the cam shaft 35 and the bearing plates 40, 41, 42, bushings 39 are mounted between the shaft 35 and the bearing plates.

As may be seen most clearly in FIGURE 3, a section 50 of the cam shaft 35 intermediate the bearing sections 43, 44 has an eccentric cam surface 52 relative to the axis 51 of the cam shaft 35. This eccentric portion 50 of the shaft 35 controls radial movement of the die plungers 57 mounted in the cavities 12, as is explained more fully hereinafter.

A non-porous metal sleeve 58 is mounted within each of the die cavities 12. These sleeves act as bearings for the plungers 57 which are made from a porous material so as to accommodate the flow of air from the grooves 17 outwardly to the die cavities. One porous material which has been found to have proper capillary repulsion when air is forced therethrough and to minimize adhesion between the plunger and a sticky substance contained within the die cavity, is porous tetrafluoroethylene. While this material is preferred, the plungers could be made from other porous materials, such as sintered metal, which have a similar air flow pattern.

The die plungers 57 have a convex peripheral surface of the same radius as that of the die roll 11. Thus, when the plungers are fully extended, as illustrated in FIGURE 3, the peripheral surface of the plungers 57 is flush with the surface of the die roll. An O-ring 59 surrounds the plungers 57 and sealingly engages the sleeves 58 to preclude the substance contained within the die cavity from seeping below the plungers and clogging the air passageways 17.

An actuating pin 60 extends inwardly from each of the plungers 57 and is slidable within one of the bushings 16 in the reinforcing sleeve 14. The inner end 61 of each of the pins 60 is located in proximity to the cam surface 50 of the cam shaft 35 such that the cam surface may engage and force the actuating pins 60 outwardly during one portion of each rotational cycle of the die roll relative to the stationary cam shaft. An O-ring 53 mounted over the pins 60 sealingly engages the bushing 16 to preclude the escapement of air into the interior of the die roll.

Inward movement of the pins 60 and thus the attached plunger 57 is controlled by longitudinal movement of wedge shaped cam elements 65. Each of these cam elements 65 is attached to a retainer fork 66 which extends longitudinally of the die roll 11 and passes on opposite sides of flats 67 cut into the sides of the pins 60. As may be seen most clearly in FIGURE 2, the cam elements 65 attached to each fork 66 control the movement of one longitudinal column of pins 60. In turn, the longitudinal movement of each retainer fork 66 is controlled by a connected piston rod 68. Each of the rods 68 is threaded into a piston 69 which is mounted for reciprocation within a cylinder barrel 70.

The cylinder barrels extend between and are rigidly mounted within the bearing plates 41, 42. One end of each of the pistons 69 extends through an end plate 71 mounted upon the end of the barrels and is engageable with a radial cam face 75 of a stationary cam 76. This cam is also fixedly secured to the frame plate 37. Springs 78 bias each of the pistons 69 toward and into engagement with the cam 76 so that longitudinal displacement of the pistons and thus of the piston rods 68 and retainers 66 is controlled by the cam 76.

To effect rotation of the die roll 11, a timing belt 80 is received within a peripheral surface groove 81 of the die roll. This belt positively drives the die roll 11 about the stationary cam shaft 35. As may be seen most clearly in FIGURE 2, rotation of the die roll 11 about the cam shaft 35 causes the plungers 69 to be moved longitudinally of the roll by the cam 76, thus forcing the wedges 65 to engage the inner edges 82 of the flats on the pins 60 to move the pins inwardly, or to the left as viewed in FIGURE 2. This effects inward or axial movement of the plungers 57 so that a recess is defined in the surface of the die roll between the die cavity sleeves 58 and the plungers 57. Icing or other material such as peanut butter, jams, jellies, or nonfood substances contained within a hopper 90 enters and fills the die cavity. Upon further rotation of the roll in a counterclockwise direction (as viewed in FIGURES 1 and 3) a squeegee or wiper 91 removes the excess material from the die cavity. After a longitudinal row of die cavities has passed the squeegee 91, the cam surface of the eccentric section 50 of the cam shaft 35 engages and forces the row of plungers within the row of cavities outwardly while simultaneously the cam 76 permits the springs 78 to force the pistons 69 to the right, as viewed in FIGURE 2. This effects withdrawals of the wedges from beneath the plungers so that the cam 52 may effect outward movement of the plungers.

Simultaneously with the outward movement of the plungers, the cam 29 actuates the valve control plungers 26 so as to allow high pressure air of the order of 15 pounds per square inch, to pass through the conduits 20, 22, and 17, to the extended plungers. In the preferred embodiment, low air pressure, at approximately 5 pounds per square inch, is maintained to the plungers 57 at all times so that a film of air is always maintained between the plungers and the cake icing. However, this low air pressure is not always required so that air pressure may be completely shut off from the plungers by the valves 25 until the plungers are extended and high pressure air is supplied. This high pressure air reduces the adhesion between the configurated cake icing and the outer convex surface of the plungers 57 so that it is free to fall of its own weight upon a cake located therebeneath.

Preferably, the cam 76 is adjustable in a direction parallel to the axis of the roll 11 so as to vary or control the extent to which the plungers 57 are moved inwardly into the die cavities during each rotational cycle of the roll. To this end, a nut 77 is operative to control the axial displacement of the cam relative to the frame support plate 37 and thus to the ends of the pistons 69. By controlling the outer limit of movement of the pistons 69, the depth of the cavities may be controlled or adjusted by the setting of the nut 77.

In the case of some substances, the weight is not sufficient relative to the stickiness and thickness to cause the formed product to fall away from the plungers even when high pressure air is passed through the porous plungers. For this reason and to insure that all products drop away from the plungers, a wiper wire 92 is mounted immediately adjacent to the bottom of the die roll. Thus, as the cake icing contained within the die cavity passes the wire 92, the wire enters between the icing and the plungers 57 causing the icing to be separated from the plungers and to drop onto a cake. High pressure air issuing from the porous plungers 57 insures that the icing does not crawl over the wire and re-engage the plunger. It has been found that in the absence of this air pressure, the icing crawls over the wire and re-engages the plunger on the opposite side of the wire, or distorts the shape, making the deposit unusable.

While the invention of this application has been described in relation to a cake icing machine, those skilled in the art to which this invention pertains will readily appreciate that this invention is equally applicable to the forming of other sticky substances, such as peanut butter, jams, jellies, raw dough, marshmallow, or even nonfood substances such as mastic materials. Additionally, those skilled in this art will readily appreciate that other changes and modifications may be made without departing from the spirit of my invention and therefore I do not intend to be limited except by the scope of the appended claims.

Having described my invention, I claim:

1. A machine for producing configurated food products comprising:
 a rotary die roll having an open interior and cavities arranged in a series of circumferential rows, the cavities of the circumferential rows being aligned in columns longitudinally of the roll,
 movable die bottom walls disposed in each of said cavities, said bottom walls being made from a porous material,
 means for introducing said product into said die cavities,
 means for passing a gaseous medium from the interior of the die roll through the porous bottom walls of the die cavities so as to reduce adhesion of the product to the bottom of the cavity,
 means for ejecting said product from said cavities, said ejection means comprising a cam operable to force said bottom walls outwardly in said cavities until the outer surfaces of said bottom walls are approximately flush with the surface of said roll, said cam being fixedly mounted relative to said rotary die roll within the interior of said roll, and
 a wiper element operable to wipe said products from said bottom walls of said cavities as said roll is rotated relative to said wiper element.

2. The machine of claim 1 further comprising second cam means cooperable with said first cam to move said bottom walls inwardly into said cavities.

3. The machine of claim 1 further comprising a longitudinally movable cam rod operatively associated with each longitudinal column of cavities and operable to simultaneously withdraw the bottom walls of a column of cavities into the interior of said roll at a predetermined angular position of the roll during each rotational cycle of the roll.

4. The machine of claim 3 further comprising a fixedly mounted cam located at one end of the rotatable die roll having a radial cam surface engageable with one end of each cam rod and operative to control the longitudinal displacement of said rods.

5. A machine for producing configurated food products comprising:
 a rotatable die roll having an open interior and die cavities arranged in a series of circumferential rows, the cavities of the circumferential rows being aligned in columns longitudinally of the roll,
 movable die bottom walls disposed in each of said cavities, said bottom walls being made from a porous material, said bottom walls being movable between a withdrawn position in which they are located within said cavities and an extended position in which the outer surfaces are approximately flush with the surface of said roll,
 means for introducing said product into said die cavity,
 means including transverse ducts extending through said die roll for passing a gaseous medium through said die roll to the inside of said porous walls and subsequently through said porous walls so as to reduce adhesion of the product to the bottom of the cavities,
 a stationary cam mounted coaxially of said die roll within the interior of said roll,
 cam follower elements extending between said stationary cam and said bottom walls of each of said cavities such that radial displacement of said bottom walls within said cavities is at least partially controlled by said cam as said die roll rotates about said cam,
 a plurality of longitudinally movable cam rods mounted within the interior of said die roll, each of said rods being operatively associated with one longitudinal column of die cavity bottom walls,
 a second fixedly mounted cam located at the end of the rotary die roll, said second cam having a radial cam surface engageable with one end of each of said cam rods, said rotary cam surface being operative to control the longitudinal displacement of said rods such that said rods cooperate with said first cam to control radial displacement of said die cavity bottom walls.

6. The machine of claim 5 wherein said second cam is adjustable in a direction parallel to the axis of said rotary die roll so as to adjust the thickness of the product formed in said die cavities.

7. A method of producing a configurated product from a sticky material such as peanut butter, jam, jelly, or a mastic material, said product being produced in a die cavity defined by a configurated side wall and a porous bottom wall, which method comprises the steps of:
 depositing a batch of said product in said cavity so as to impart a desired shape to said batch and thus form a configurated food product,
 reducing the volume of said cavity by moving said porous bottom wall outwardly relative to said side wall so as to force said configurated product outwardly from said die cavity,
 forcing air at a pressure above that of atmospheric pressure through said porous bottom wall so as to reduce surface adhesion between said configurated product and said porous bottom wall,
 effecting relative movement of a wiper element and said bottom wall while forcing air at a pressure above that of atmospheric pressure through said porous bottom wall so that the wiper element enters between said bottom wall of said cavity and said product while said bottom wall is extended outwardly so as to force said configurated product completely out of said die cavity and onto a transport medium, and
 continuing to force air at a pressure above that of atmospheric pressure through said porous bottom wall until after said bottom wall has passed the wiper element whereby said product is prevented from crawling over said wiper element and reengaging said bottom wall.

8. The method of claim 7 wherein said wiper element is located beneath said bottom wall when said bottom wall passes said wiper element and wherein said air pressure is operative to blow the leading edge of said product downwardly and peel said product off of said bottom wall as said bottom wall is moved relative to said wiper element.

References Cited

UNITED STATES PATENTS

| | | | |
|---|---|---|---|
| 1,954,501 | 4/1934 | Steere | 107—15 |
| 2,858,775 | 11/1958 | Marasso | 107—15 |
| 3,136,268 | 6/1964 | Gageant | 107—1 |
| 3,205,837 | 9/1965 | Fay | 107—8 |

WALTER A. SCHEEL, *Primary Examiner.*

JOSEPH SHEA, *Assistant Examiner.*

U.S. Cl. X.R.

18—2, 21; 107—54; 264—297, 335